(12) United States Patent
Kumar

(10) Patent No.: US 7,580,705 B2
(45) Date of Patent: Aug. 25, 2009

(54) REMOTE WIRELESS ACCESS NODE CONTROL

(75) Inventor: Dev Kumar, San Jose, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 314 days.

(21) Appl. No.: 11/247,723

(22) Filed: Oct. 11, 2005

(65) Prior Publication Data

US 2007/0081478 A1    Apr. 12, 2007

(51) Int. Cl.
 *H04M 3/00* (2006.01)
(52) U.S. Cl. .................. 455/420; 455/557; 455/558
(58) Field of Classification Search ............ 370/310, 370/328, 338, 241, 241.1, 242, 243, 244, 370/245, 246, 247, 248, 251; 455/566–567, 455/404.2, 418–420, 423–424, 535.1, 445, 455/41.2, 557–558, 435.1; 709/203, 217, 709/219, 229; 348/E7.063, E7.071
See application file for complete search history.

(56) References Cited

U.S. PATENT DOCUMENTS

| | | | |
|---|---|---|---|
| 5,454,037 A | 9/1995 | Pacela | |
| 6,724,879 B1* | 4/2004 | Peltonen et al. | 379/219 |
| 6,781,576 B2* | 8/2004 | Tamura | 345/173 |
| 6,963,311 B1* | 11/2005 | Enns | 343/702 |
| 2004/0174251 A1* | 9/2004 | Fisher et al. | 340/310.01 |
| 2004/0268408 A1* | 12/2004 | Lee et al. | 725/116 |
| 2005/0197136 A1* | 9/2005 | Friday et al. | 455/456.1 |
| 2005/0198199 A1* | 9/2005 | Dowling | 709/217 |
| 2006/0251115 A1* | 11/2006 | Haque et al. | 370/466 |
| 2006/0268793 A1* | 11/2006 | Zanaty | 370/338 |
| 2007/0222581 A1* | 9/2007 | Hawkins et al. | 340/539.1 |

* cited by examiner

*Primary Examiner*—Dwayne Bost
*Assistant Examiner*—Inder P Mehra
(74) *Attorney, Agent, or Firm*—Brian R. Short

(57) ABSTRACT

A wireless access node is disclosed. The wireless access node includes a primary CPU for controlling wireless data transmission and reception, of the wireless access node with other access nodes. A secondary controller provides alternate control of the wireless access node. The secondary controller is separately controllable by a system operator.

12 Claims, 6 Drawing Sheets

REMOTE WIRELESS ACCESS NODE CONTROL

FIELD OF THE INVENTION

The invention relates generally to wireless communications. More particularly, the invention relates to a method and apparatus of allowing a system operator to remotely control some basic functions of a wireless access node.

BACKGROUND OF THE INVENTION

Packet networking is a form of data communication in which data packets are routed from a source device to a destination device. Packets can be networked directly between a source node and a destination node, or the packets can be relayed through a number of intermediate nodes.

A wireless network can include a wireless device (client) being connected to a network through a base station (or gateway) that is wired to the network. The wireless device can transmit data packets that are received by the gateway and then routed through the network. The wireless network can include many gateways that are each wired to the network.

FIG. 1 shows a prior art mesh network. As shown, clients 150, 160 are able to access an internet network 100 through a wired network 105, and a mesh network that includes gateways 110, 120 and access nodes 130, 140. The mesh network infrastructure including the gateways 110, 120 and the access nodes 130, 140 can be placed, for example, on top of streetlights. Placement of the gateways 110, 120 and the access nodes 130, 140 on streetlights allows the gateways 110, 120 and the access nodes 130, 140 to be remotely located, while providing generally unobstructed transmission paths between each other. Additionally, streetlights have power supplies available that can easily be used for powering the gateways 110, 120 and the access nodes 130, 140

It is desirable to have the gateways 110, 120 and the access nodes 130, 140 remotely located because they are less likely to be interfered with by vandals or those who may want to breach security of the network. It is also desirable to provide the network with unobstructed transmission paths for better RF propagation. Unobstructed transmission paths typically suffer from less transmission multi-path and fading which can reduce the effectiveness of transmission signals between the gateways 110, 120 and the access nodes 130, 140.

While generally desirable, remotely locating the gateways 110, 120 and the access nodes 130, 140 can complicate maintenance of the gateways 110, 120 and the access nodes 130, 140. For example, the gateways 110, 120 and the access nodes 130, 140 typically include a central processing unit (CPU) which under some situations can "hang up" and cease to operate. As previously described, the gateways 110, 120 and the access nodes 130, 140 are networked. If one fails, the performance and operation of the network is degraded. Therefore, it is desirable to maintain the gateways 110, 120 and the access nodes 130, 140 by rebooting a gateway or access node that has ceased to operate properly. Other desirable maintenance features include re-setting the gateways 110, 120 and the access nodes 130, 140 to factory settings.

Rebooting a gateway or access node that has ceased operating properly requires physically accessing the gateway or access node. The remoteness of the locations of the gateways 110, 120 and the access nodes 130, 140 can make this difficult.

It is desirable to have a wireless mesh network that includes access nodes that a system operator can easily access and control. It is additionally desirable to maintain security of the access nodes and allow the access nodes to be remotely located.

SUMMARY OF THE INVENTION

The invention includes an apparatus and method for providing system operator control over access nodes of a wireless network that are remotely located.

An embodiment includes a wireless access node. The wireless access node includes a primary CPU for controlling wireless data transmission and reception, of the wireless access node with other access nodes. A secondary controller provides alternate control of the wireless access node. The secondary controller is separately controllable by a system operator.

Another embodiment includes a method of providing secondary control of a wireless access node. The method includes providing a system operator controllable access to a secondary controller, allowing alternate controls of the wireless access node, without interaction with primary CPU functions that controls wireless data transmission and reception of the wireless access node with other access nodes. The wireless access node executes the alternate controls.

Other aspects and advantages of the present invention will become apparent from the following detailed description, taken in conjunction with the accompanying drawings, illustrating by way of example the principles of the invention.

DETAILED DESCRIPTION

Figure 1:
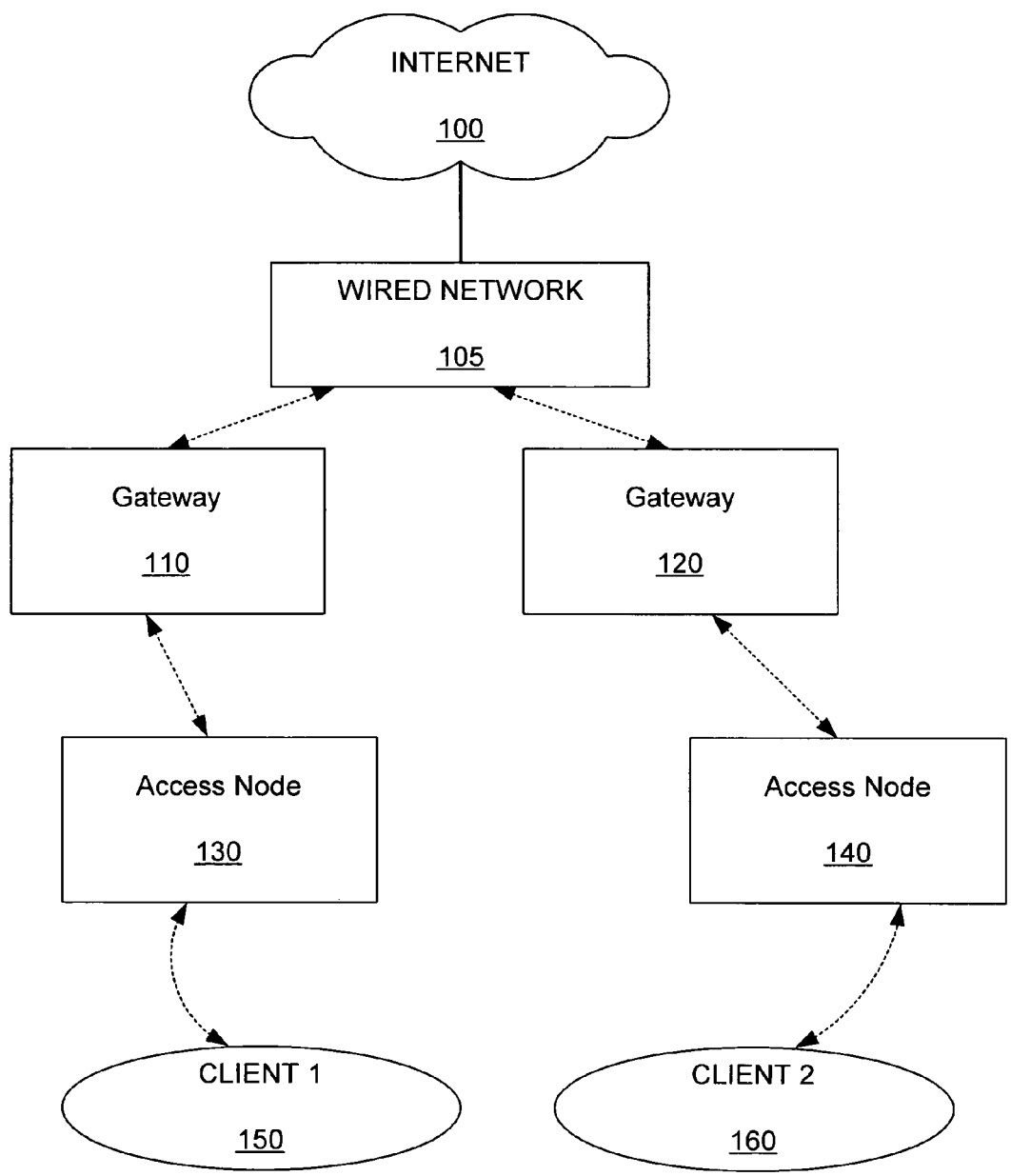
FIG. 1 shows a prior art mesh network.

As shown in the drawings for purposes of illustration, the invention is embodied in an apparatus and method for providing a system operator alternate control over access nodes of a wireless mesh network.

Figure 2:
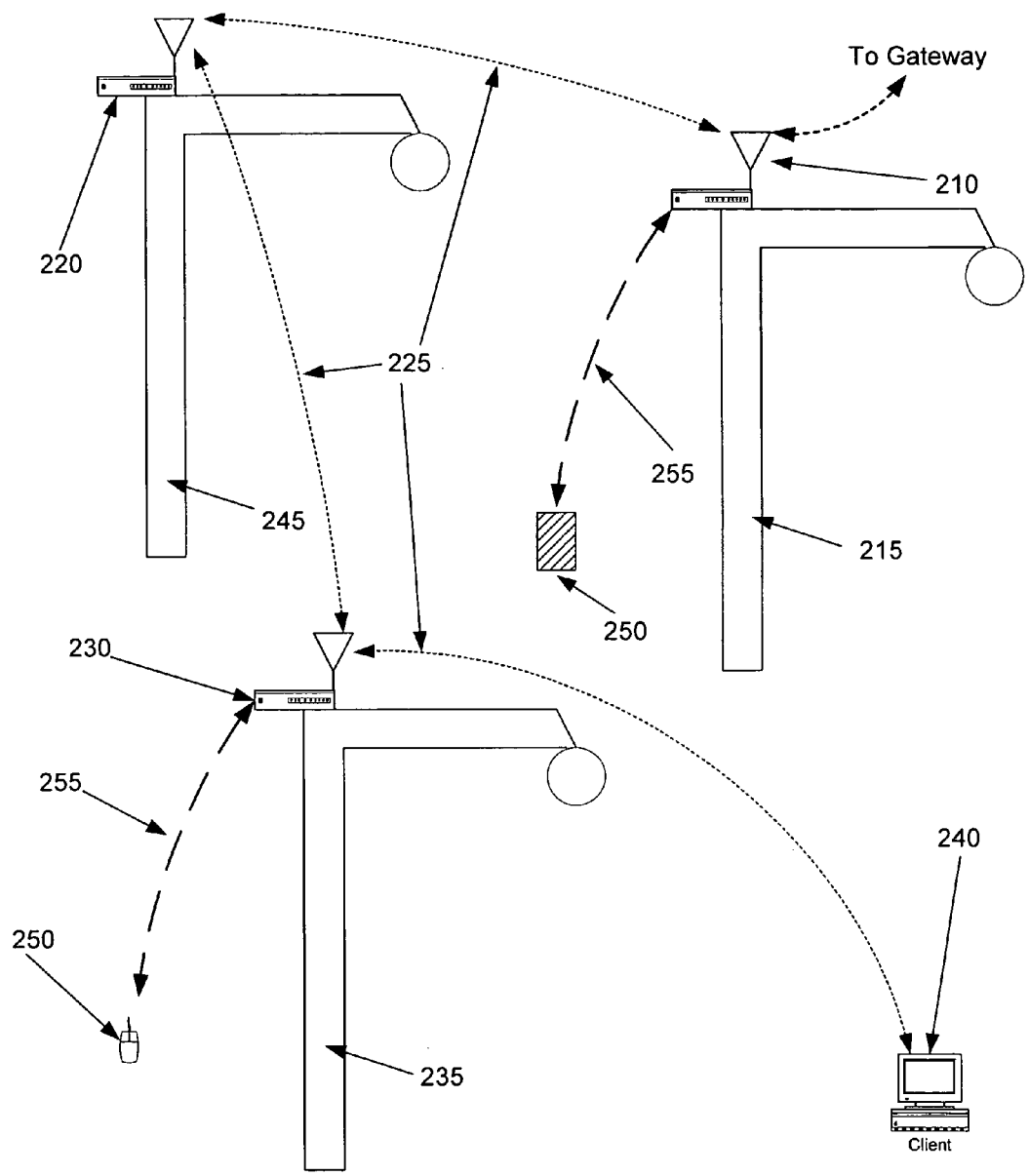
FIG. 2 shows an access node mounted on a streetlight pole.

FIG. 2 shows access nodes 210, 220, 230 mounted on, for example, streetlight poles 215, 245, 235. The access nodes 210, 220, 230 execute routing protocols to determine routing paths through a wireless mesh network formed by the access nodes 210, 220, 230. The access nodes 210, 220, 230 are connected to a gateway (not shown), which can be wired, or wirelessly connected to an upstream wired network. The exemplary mesh network of FIG. 2 includes the access node 210 being wirelessly connected to a gateway. However, any of the other access nodes 220, 230 could just as easily be connected to a gateway. Additionally, anyone of the access node can alternatively function as a gateway. An access node operating as a gateway typically has a broadband connection to another network.

A client 240 is able to route communication data to the gateway through the access nodes 210, 220, 230. The mesh network of FIG. 2 shows an exemplary route from the gateway to the client 240 through access nodes 210, 220, 230. The data is typically routed through wireless channels (shown by dashed lines 225). An exemplary wireless channel is an 802.11 wireless channel.

Streetlight poles are convenient locations to mount the access nodes 210, 220, 230. Light poles typically have power supplies that can be accessed for powering the access nodes 210, 220, 230. Streetlights are commonly located, and provide a high elevation which can provide well-behaved transmission paths between the access nodes 210, 220, 230 and client 240. Additionally, the high elevation provides the access nodes 210, 220, 230 with an environment that is a relatively secure and safe from intrusion.

FIG. 2 also shows portable control units 250 that allow a system operator to separately access the access nodes 210, 220, 230. An exemplary portable control unit is a universal remote control (such as, a television, VCR, DVR or other consumer infrared remote control) that provides an infrared signal that can be coupled into the access nodes 210, 220, 230. The infrared signal is a separate mode of communication than the data transmission and reception of the wireless access node. That is, the communication between the access nodes 210, 220, 230 can be through 802.11 transmission channels, whereas the communication between the portable control unit and the access nodes 210, 220, 230 is infrared. Other possible types of communication between portable control unit and the access nodes 210, 220, 230 include radio frequency (RF), optical or ultrasonic. The primary condition with the separate mode of communications is that it not interfere with the communication between the access nodes. In fact, the communication can be over the same transmission channels as the communication between the access nodes, as long as it does not interfere with the communication between the access nodes. Generally, the separate mode of communication can be termed "out of band" from the wireless access node communication.

The system operator is provided with alternate control of the access nodes. Alternate control can include at resetting a primary CPU, cycling a master power control, resetting of factory default settings, setting the access node into a sleep mode, or resetting a peripheral device. Because the separate mode of communications is out of band, an embodiment includes the alternate controls being operable even if primary network/wireless interfaces are not operating. Additionally, the alternate control can be operable even if a primary CPU within the access node is not properly operating.

If an access node hangs up, and ceases to properly operate, a system operator can reset the access node through the alternate control provided by the portable control unit. Reset control can include resetting a primary CPU or cycling power to the access node. Additionally, the system operator can reset the access nodes to, for example, manufacturer settings. Other reset states can be alternatively or additionally defined. Another embodiment includes the alternate control providing control over a device that is peripheral to the access node, but connected to the access node or controllable by the access node.

The remote locations of the access nodes provide some security. Additional security can be provided by encrypting the communication signals associated with the alternate form of communications. Each access node can have a unique code that provides secure access to each of the access nodes. An exemplary embodiment includes each access node being accessible by a system operator through a coded (encrypted) infrared signal. A unique code identifies (allows access to) each access node.

An embodiment includes an interface to the access nodes which allows the separate mode of communication being located on an underside of the access nodes, allowing the system operator to control the access nodes from below the access nodes. The interface can be as simple as an aperture window. For an infrared portable control unit, the interface can be a polycarbonate light pipe that guides infrared from outside of the access node to the inside, and a light-gathering lens integrates the infrared signal on the inside of the access node.

Figure 3:
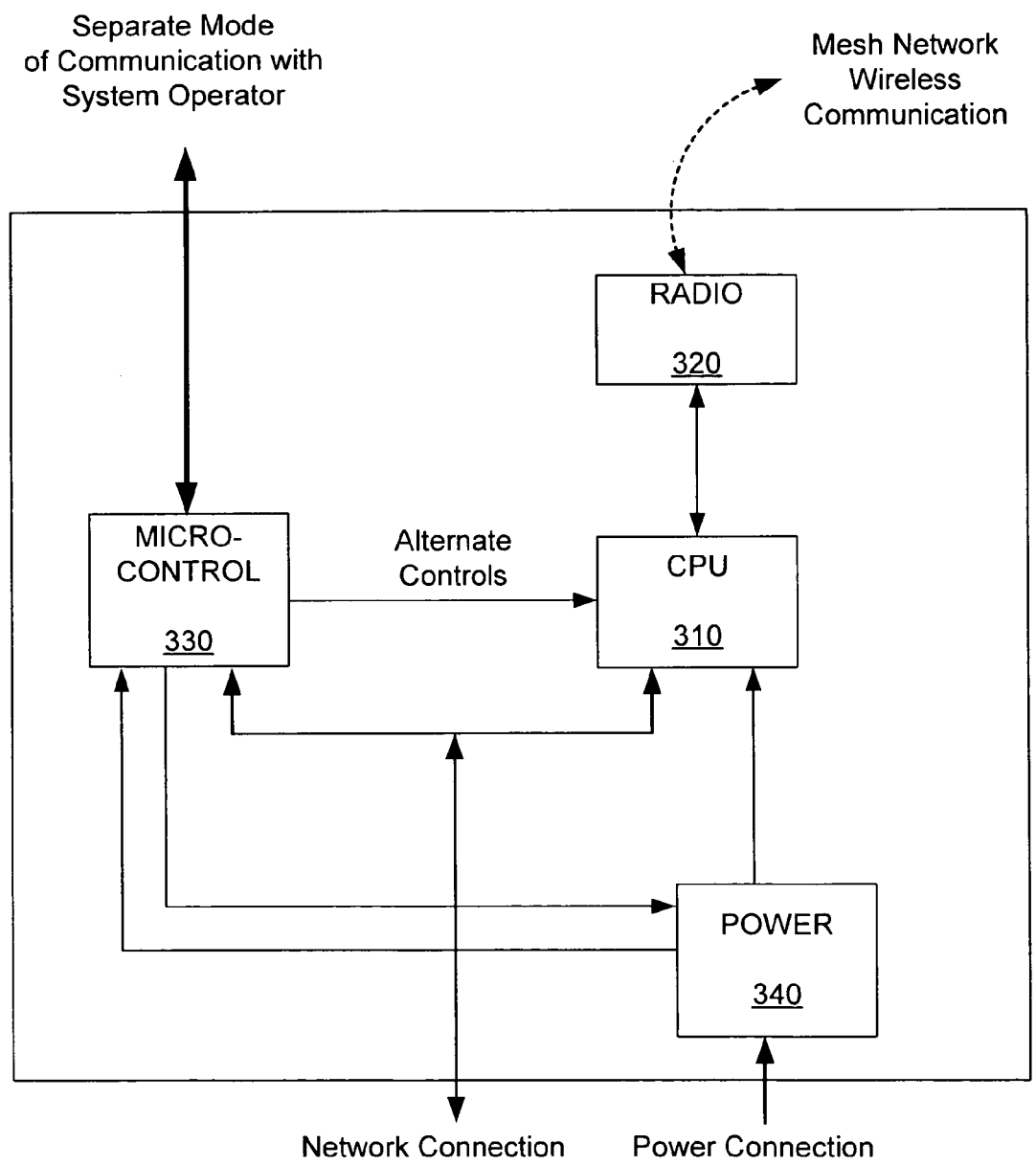
FIG. 3 shows a block diagram of an access node that includes a primary CPU and a secondary controller.

FIG. 3 shows a block diagram of an exemplary access node that includes a primary CPU 310 and a secondary controller (shown as a microcontroller) 330. The separate mode of communication is coupled to the secondary controller 330.

The communication between the access node and other access nodes and gateways is controlled by the primary controller 310. This control can include routing selections through the access nodes of the wireless network, channel selections and transmission scheduling.

The primary controller 310 can be connected to a radio that enables the wireless communications to and from the access node, and connects the access node to the rest of the network. An exemplary radio is a radio that follows an 802.11 protocol.

A power control unit 340 provides power to the primary controller 310 and the secondary controller 330. The secondary controller 330 can control power to the primary controller 310, and/or provide reset functions to the primary controller 310.

The secondary controller can be a traditional microcontroller, or the secondary controller can be simple circuitry (digital and/or analog) that receives commands from a system operator for execution. For example, the secondary controller can perform functions as simple as resetting the primary controller 310 which merely requires generating a reset signal based upon a command received from the system operator. Another embodiment of the secondary controller is a watch dog mode controller contained within the primary controller 310. The watch dog mode controller (a software program operating on the primary controller) acts independently from the primary controller software, but can reset the primary controller if applications of the primary controller fail, and an indicator from a system operator is received.

Figure 4:
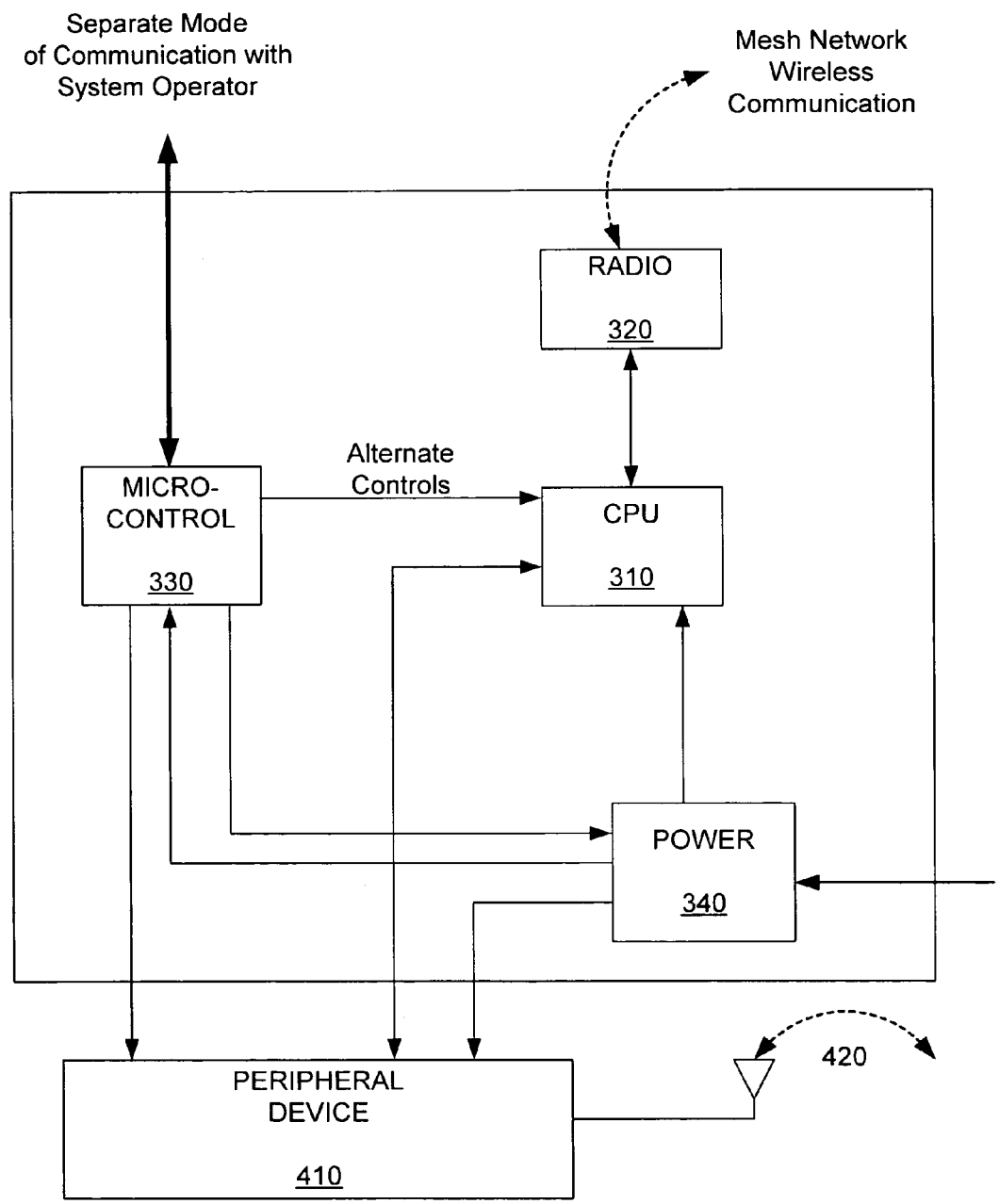
FIG. 4 shows an access node that additionally controls a peripheral device.

FIG. 4 shows an access node that additionally controls a peripheral device 410. Examples of peripherals devices includes a third party radio, a new technology radio, a point-to-point radio, media converters, a storage device, a camera, a switch or hub.

One example of a peripheral device is a broadband point-to-point wireless transceiver. The transceiver can be located on the common streetlight as the access node. Generally, access nodes that include this type of peripheral device are gateways. An antenna 420 is attached to the peripheral device providing a broadband transmission channel.

Through the wireless access node, a system operator can perform functions on the peripheral device. The functions can be a simple as resetting the peripheral device or power cycling the peripheral device.

Figure 5:
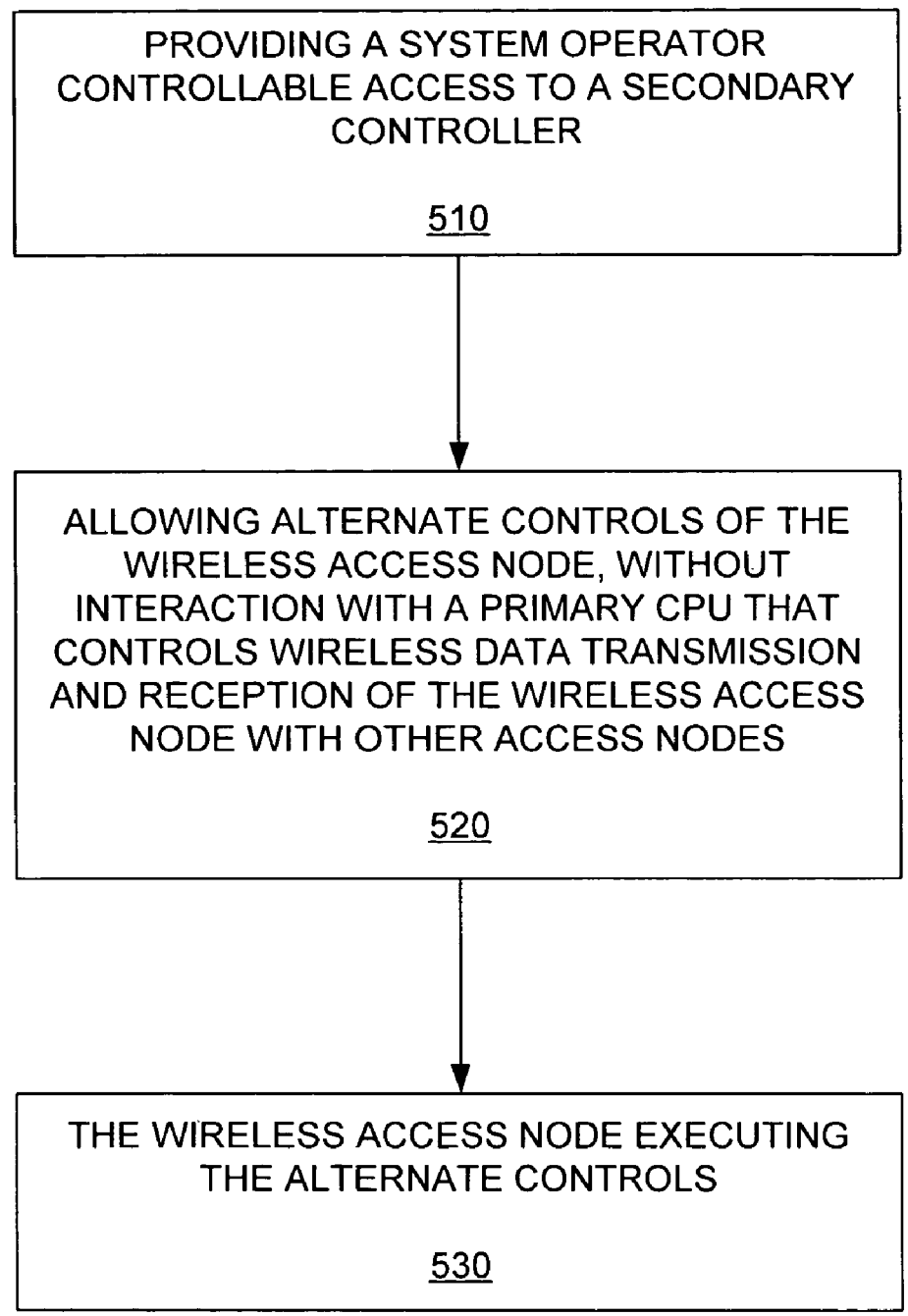
FIG. 5 is a flow chart that includes steps of a method of providing secondary control of a wireless access node.

FIG. 5 is a flow chart that includes steps of a method of providing secondary control of a wireless access node. A first step 510 includes providing a system operator controllable access to a secondary controller. A second step 520 includes allowing alternate controls of the wireless access node, without interaction with a primary CPU that controls wireless data transmission and reception of the wireless access node with other access nodes. A third step 530 includes the wireless access node executing the alternate controls.

As previously stated, the system operator can control the second controller through a separate mode of communication than the data transmission and reception of the wireless access node. One mode of separate communications is an infrared link. The secondary controller can be a separate microcontroller, simple logic gates, analog circuitry, or a watch dog mode program operable on the primary CPU that acts independently from primary CPU software, and is responsive to the system operator.

The system operator can link to the second controller through an infrared link provided on a bottom portion of the wireless access node. Additionally, a status indication of the wireless access node can be provided to the system operator though a light indicator located on the bottom portion of the wireless access node.

Figure 6:
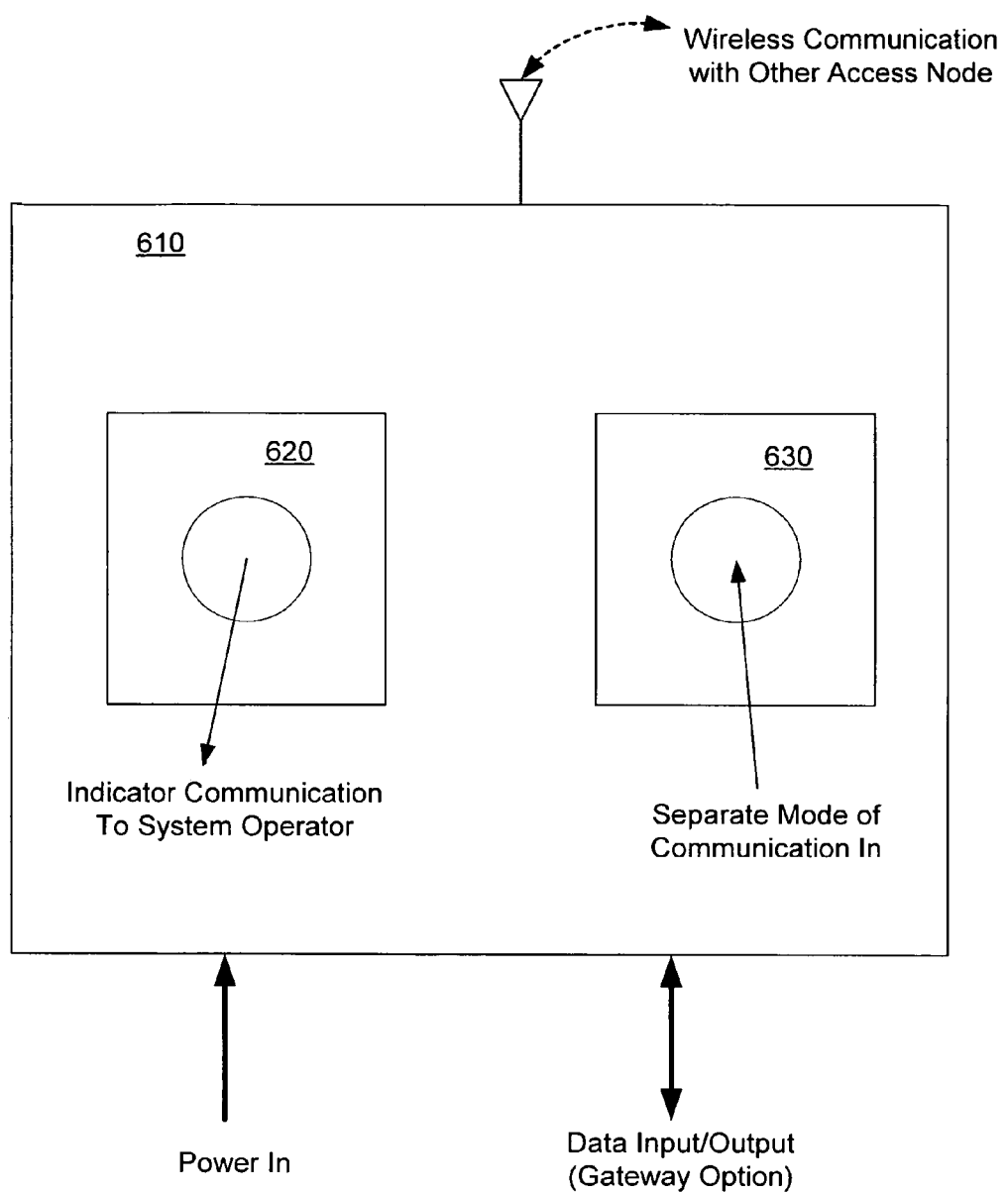
FIG. 6 is another embodiment of an access node that includes and access area which provides a separate mode of communication into the access node and a system indicator to a system operator.

FIG. 6 is another embodiment of an access node 610 that includes and access areas 620, 630 which provide a separate mode of communication into the access node and a system indicator to a system operator. For this embodiment, the access areas can be located on an underside of the access node 610 allowing the system operator to communicate to and from the access node from below the access node. This configuration is adaptable for communication between the system operator and access nodes mounted on streetlights which are typically located above the system operator.

The first portion 620 provides an output indicator that allows a system operator to obtain information about the access node 610. The output indictor can be visual through, for example, light emitting diodes. Alternatively, the output indicator can be audible to provide an indicator that the system operator can hear. Other forms of the output indicator include RF or infrared, which can be detected by a unit (for example, a portable unit) that is controllable or accessible by the system operator. Based upon the indicators provided by the access node, the unit can provide any desired information about the access node to the system operator.

The second portion 630 provides an input access to the access node 610 by the system operator. The input access allows the system operator to communicate with the access node 610 with a separate mode of communication. As previously described, an exemplary separate mode of communication is an infrared signal that couples into the access node 610. The infrared signal is a separate mode of communication than the data transmission and reception of the wireless access node. The communication between the access nodes can be through 802.11 transmission channels, whereas the communication between the system operator and the access node 610 is infrared. Other possible types of communication with the access node 610 include radio frequency (RF) or ultrasonic. The primary condition with the separate mode of communications is that it not interfere with the communication between the access nodes.

Although specific embodiments of the invention have been described and illustrated, the invention is not to be limited to the specific forms or arrangements of parts so described and illustrated. The invention is limited only by the appended claims.

What is claimed:

1. A wireless access node comprising:
   a primary CPU for controlling wireless data transmission and reception, of the wireless access node with other access nodes;
   a secondary controller for providing alternate control of the wireless access node, the secondary controller separately controllable by a system operator, allowing alternate controls of the wireless access node without interaction with primary CPU functions that control wireless data transmission and reception of the wireless access node with other access nodes, wherein system operator control is received by the wireless access node through a separate mode of wireless communication than the data transmission and reception of the wireless access node; and
   an access area on an exterior of the wireless access node which provides an infrared path into the wireless access node, and a light indicator out of the wireless access node, wherein the access area is located on a lower side of the wireless access node enabling a system operator located below the wireless access node to couple an infrared signal into the infrared path, and to visually observe the light indicator.

2. The wireless access node of claims 1, wherein the separate mode of communication is out-of-band from the data transmission and reception of the wireless access node.

3. The wireless access node of claims 1, wherein the separate mode of communication comprises at least one of infrared and radio frequency communication.

4. The wireless access node of claims 1, wherein the separate mode of communication requires an access code that is unique to the wireless access node.

5. The wireless access node of claim 1, wherein the secondary controller providing alternate control of the wireless access node comprises a primary CPU reset, a master power control, resetting of factory default settings, resetting a peripheral device.

6. The wireless access node of claim 1, wherein the secondary controller is a watch dog mode program operable on the primary CPU that acts independently from primary CPU software, and is responsive to the system operator.

7. The wireless access node of claims 1, wherein the system operator can use a hand-held device for providing the separate wireless control of the wireless access node through a separate mode of wireless communication.

8. The wireless access node of claim 7, wherein the hand-held device is a universal remote control unit.

9. The wireless access node of claims 1, wherein the infrared path provides the system operator with an ability to control the secondary controller.

10. A method of providing secondary control of a wireless access node, comprising:
   providing a system operator controllable access to a secondary controller, allowing alternate controls of the wireless access node, without interaction with primary CPU functions that controls wireless data transmission and reception of the wireless access node with other access nodes;
   the system operator linking to the second controller through an infrared link provided on a bottom portion of the wireless access node;
   providing a status indication of the wireless access node though a light indicator located on the bottom portion of the wireless access node;
   the wireless access node executing the alternate controls.

11. The method of claim 10, wherein the secondary controller is a watch dog mode program operable on the primary CPU that acts independently from primary CPU software, and is responsive to the system operator.

12. A wireless access node comprising:
   a primary CPU for controlling wireless data transmission and reception, of the wireless access node with other access nodes;
   a secondary controller for providing alternate control of the wireless access node, the secondary controller separately controllable by a system operator, allowing alternate controls of the wireless access node without interaction with primary CPU functions that controls wireless data transmission and reception of the wireless access node with other access nodes, the alternate control comprising at least a primary CPU reset;

an access area on an exterior of the wireless access node which provides an infrared path into the wireless access node, and a light indicator out of the wireless access node, wherein the infrared path provides the system operator with an ability to control the secondary controller, and wherein the access area is located on a lower side of the wireless access node enabling a system operator located below the wireless access node to couple an infrared, signal into the infrared path, and to visually observe the light indicator; wherein the wireless access node is mounted on a streetlight.

* * * * *